(12) United States Patent
Raghavan et al.

(10) Patent No.: US 12,309,612 B2
(45) Date of Patent: May 20, 2025

(54) BEAM CORRELATION METRIC REPORTING

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/814,713

(22) Filed: Jul. 25, 2022

(65) Prior Publication Data

US 2024/0031824 A1    Jan. 25, 2024

(51) Int. Cl.
    *H04W 16/28*    (2009.01)
    *H04B 7/06*     (2006.01)
    *H04W 76/19*    (2018.01)

(52) U.S. Cl.
    CPC .......... *H04W 16/28* (2013.01); *H04B 7/0695* (2013.01); *H04W 76/19* (2018.02)

(58) Field of Classification Search
    CPC ..... H04W 16/28; H04W 76/19; H04W 24/02; H04W 72/046; H04W 24/10; H04B 7/0695; H04B 7/06952
    See application file for complete search history.

(56) References Cited

U.S. PATENT DOCUMENTS

| | | | |
|---|---|---|---|
| 2020/0022000 A1* | 1/2020 | Venugopal | H04B 7/088 |
| 2021/0226689 A1* | 7/2021 | Farag | H04W 24/10 |
| 2021/0359736 A1* | 11/2021 | Petersson | H04L 5/0037 |

\* cited by examiner

*Primary Examiner* — Thai Nguyen
(74) *Attorney, Agent, or Firm* — Harrity & Harrity, LLP

(57) ABSTRACT

Various aspects of the present disclosure generally relate to wireless communication. In some aspects, a network node may receive, from a plurality of user equipments (UEs), beam reports that indicate dominant transmission configuration indicator (TCI) states for the plurality of UEs. The network node may transmit, to a set of UEs selected from the plurality of the UEs based at least in part on the beam reports, indications to report a beam correlation metric. The network node may receive, from the set of UEs, respective indications of the beam correlation metric. Numerous other aspects are described.

30 Claims, 11 Drawing Sheets

US 12,309,612 B2

BEAM CORRELATION METRIC REPORTING

FIELD OF THE DISCLOSURE

Aspects of the present disclosure generally relate to wireless communication and to techniques and apparatuses for beam correlation metric reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network node for wireless communication. The network node may include a memory and one or more processors coupled to the memory. The one or more processors may be configured to receive, from a plurality of user equipments (UEs), beam reports that indicate dominant transmission configuration indicator (TCI) states for the plurality of UEs. The one or more processors may be configured to transmit, to a set of UEs selected from the plurality of the UEs based at least in part on the beam reports, indications to report a beam correlation metric. The one or more processors may be configured to receive, from the set of UEs, respective indications of the beam correlation metric.

Some aspects described herein relate to a UE for wireless communication. The UE may include a memory and one or more processors coupled to the memory. The one or more processors may be configured to transmit, to a network node, a beam report including an indication of one or more dominant TCI states. The one or more processors may be configured to receive, from the network node, an indication to report a beam correlation metric. The one or more processors may be configured to transmit, to the network node, an indication of the beam correlation metric.

Some aspects described herein relate to a method of wireless communication performed by a network node. The method may include receiving, from a plurality of UEs, beam reports that indicate dominant TCI states for the plurality of UEs. The method may include transmitting, to a set of UEs selected from the plurality of the UEs based at least in part on the beam reports, indications to report a beam correlation metric. The method may include receiving, from the set of UEs, respective indications of the beam correlation metric.

Some aspects described herein relate to a method of wireless communication performed by a UE. The method may include transmitting, to a network node, a beam report including an indication of one or more dominant TCI states. The method may include receiving, from the network node, an indication to report a beam correlation metric. The method may include transmitting, to the network node, an indication of the beam correlation metric.

Some aspects described herein relate to a non-transitory computer-readable medium that stores a set of instructions for wireless communication by a network node. The set of instructions, when executed by one or more processors of the network node, may cause the network node to receive, from a plurality of UEs, beam reports that indicate dominant TCI states for the plurality of UEs. The set of instructions, when executed by one or more processors of the network node, may cause the network node to transmit, to a set of UEs selected from the plurality of the UEs based at least in part on the beam reports, indications to report a beam correlation metric. The set of instructions, when executed by one or more processors of the network node, may cause the network node to receive, from the set of UEs, respective indications of the beam correlation metric.

Some aspects described herein relate to a non-transitory computer-readable medium that stores a set of instructions for wireless communication by a UE. The set of instructions, when executed by one or more processors of the UE, may cause the UE to transmit, to a network node, a beam report including an indication of one or more dominant TCI states. The set of instructions, when executed by one or more processors of the UE, may cause the UE to receive, from the network node, an indication to report a beam correlation metric. The set of instructions, when executed by one or more processors of the UE, may cause the UE to transmit, to the network node, an indication of the beam correlation metric.

Some aspects described herein relate to an apparatus for wireless communication. The apparatus may include means for receiving, from a plurality of UEs, beam reports that indicate dominant TCI states for the plurality of UEs. The apparatus may include means for transmitting, to a set of UEs selected from the plurality of the UEs based at least in part on the beam reports, indications to report a beam correlation metric. The apparatus may include means for receiving, from the set of UEs, respective indications of the beam correlation metric.

Some aspects described herein relate to an apparatus for wireless communication. The apparatus may include means for transmitting, to a network node, a beam report including an indication of one or more dominant TCI states. The apparatus may include means for receiving, from the network node, an indication to report a beam correlation metric. The apparatus may include means for transmitting, to the network node, an indication of the beam correlation metric.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
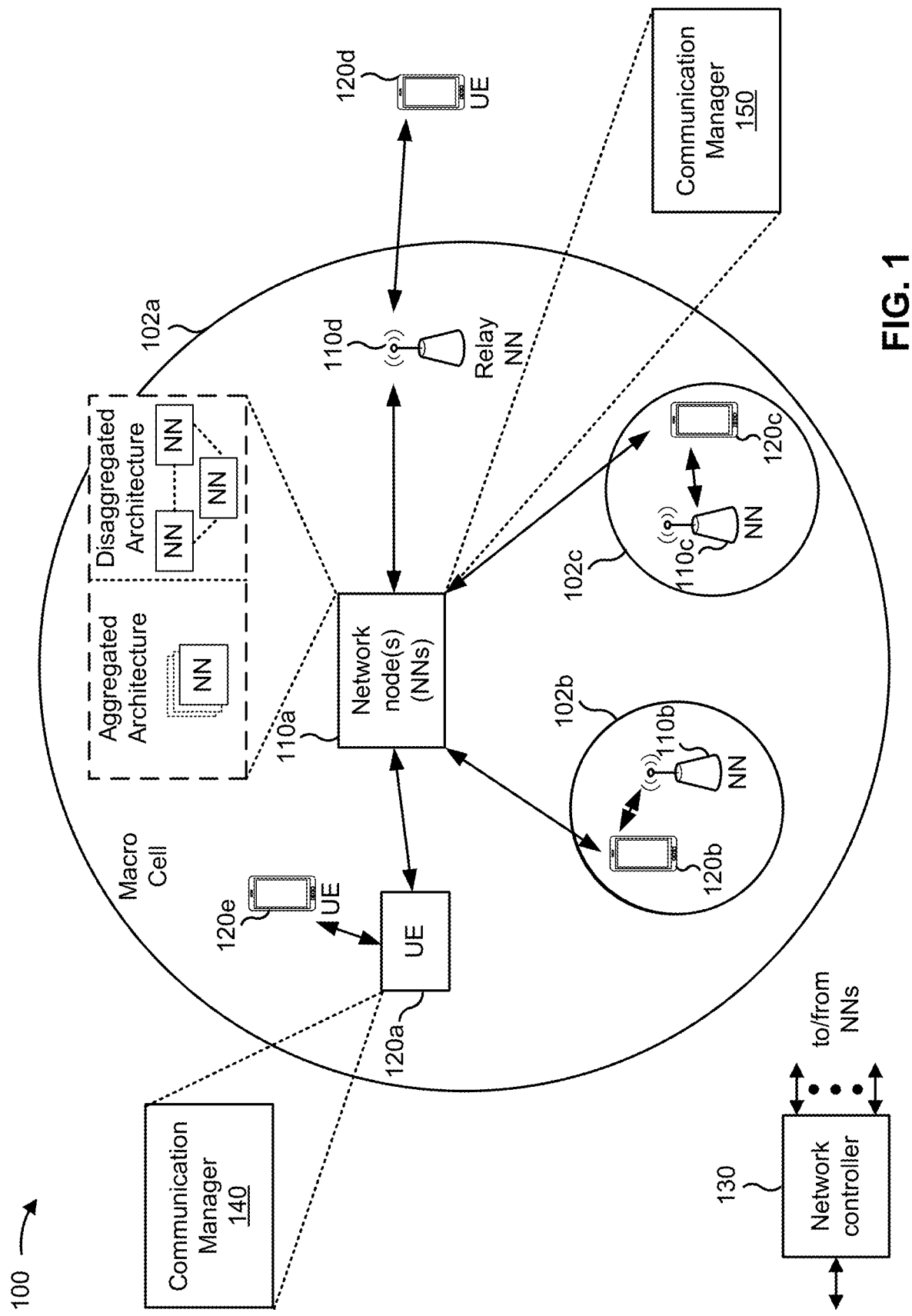
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a network node, a beam report including an indication of one or more dominant transmission configuration indicator (TCI) states; receive, from the network node, an indication to report a beam correlation metric; and transmit, to the network node, an indication of the beam correlation metric. Additionally, or alternatively, the communication manager 140 may perform one or more other operations described herein.

In some aspects, the network node 110 may include a communication manager 150. As described in more detail elsewhere herein, the communication manager 150 may receive, from a plurality of UEs, beam reports that indicate dominant TCI states for the plurality of UEs; transmit, to a set of UEs selected from the plurality of the UEs based at least in part on the beam reports, indications to report a beam correlation metric; and receive, from the set of UEs, respective indications of the beam correlation metric. Additionally, or alternatively, the communication manager 150 may perform one or more other operations described herein.

As indicated above, FIG. 1 is provided as an example. Other examples may differ from what is described with regard to FIG. 1.

Figure 2:
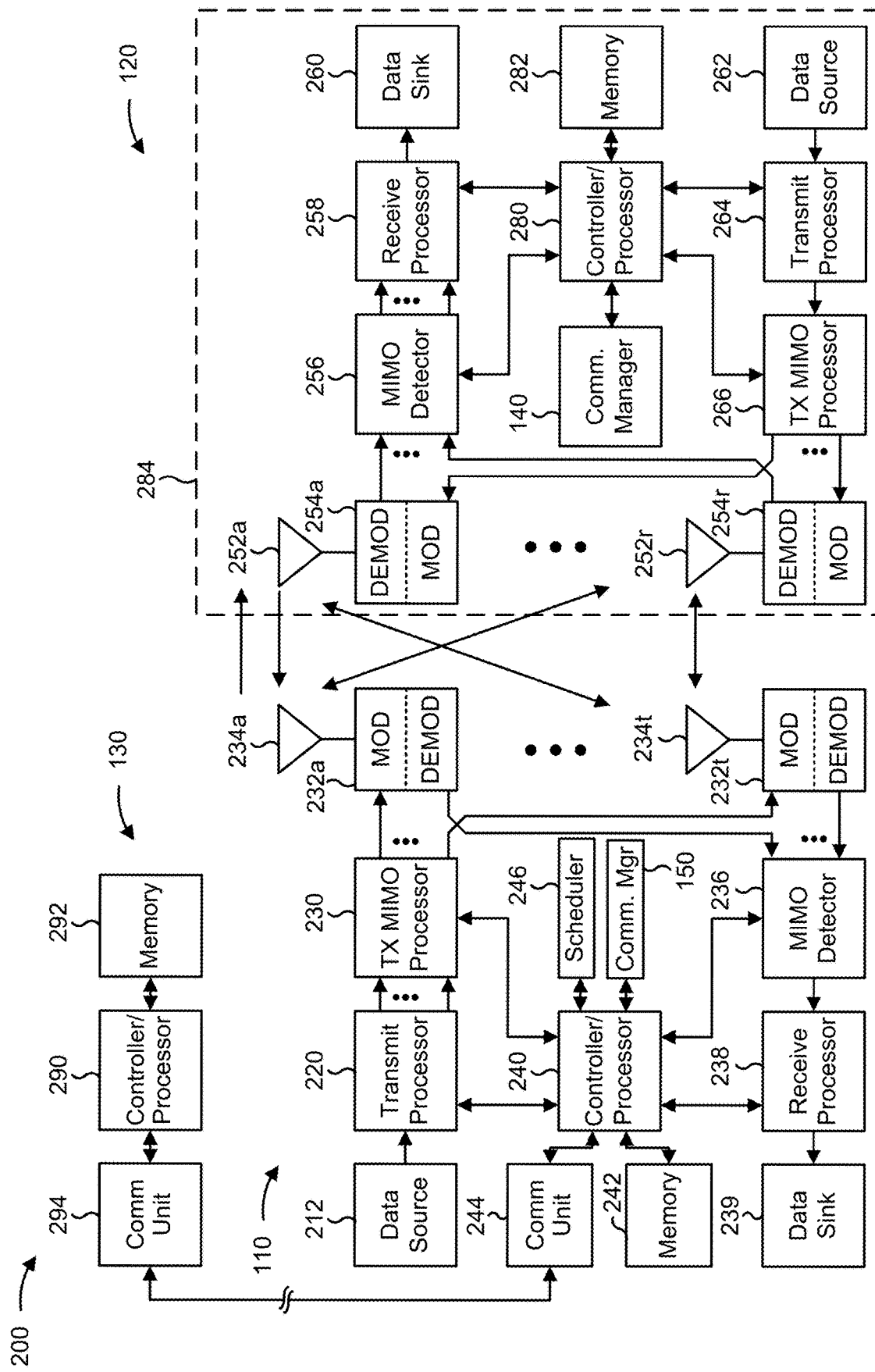
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the network node 110, the controller/processor 280 of the UE 120, and/or any other component(s) of FIG. 2 may perform one or more techniques associated with beam correlation metric reporting, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for receiving, from a plurality of UEs, beam reports that indicate dominant TCI states for the plurality of UEs; means for transmitting, to a set of UEs selected from the plurality of the UEs based at least in part on the beam reports, indications to report a beam correlation metric; and/or means for receiving, from the set of UEs, respective indications of the beam correlation metric. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for transmitting, to a network node, a beam report including an indication of one or more dominant TCI states; means for receiving, from the network node, an indication to report a beam correlation metric; and/or means for transmitting, to the network node, an indication of the beam correlation metric. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
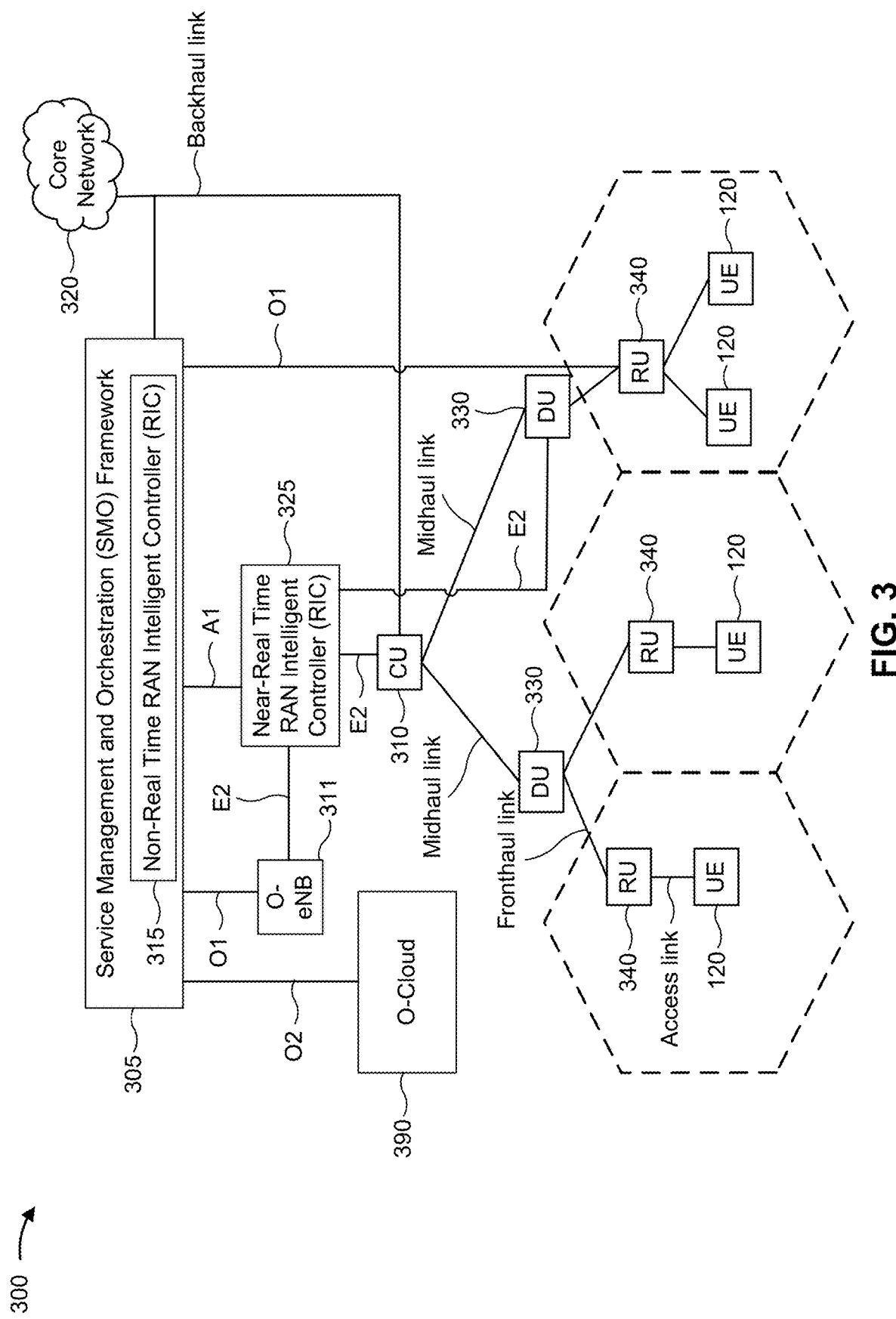
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
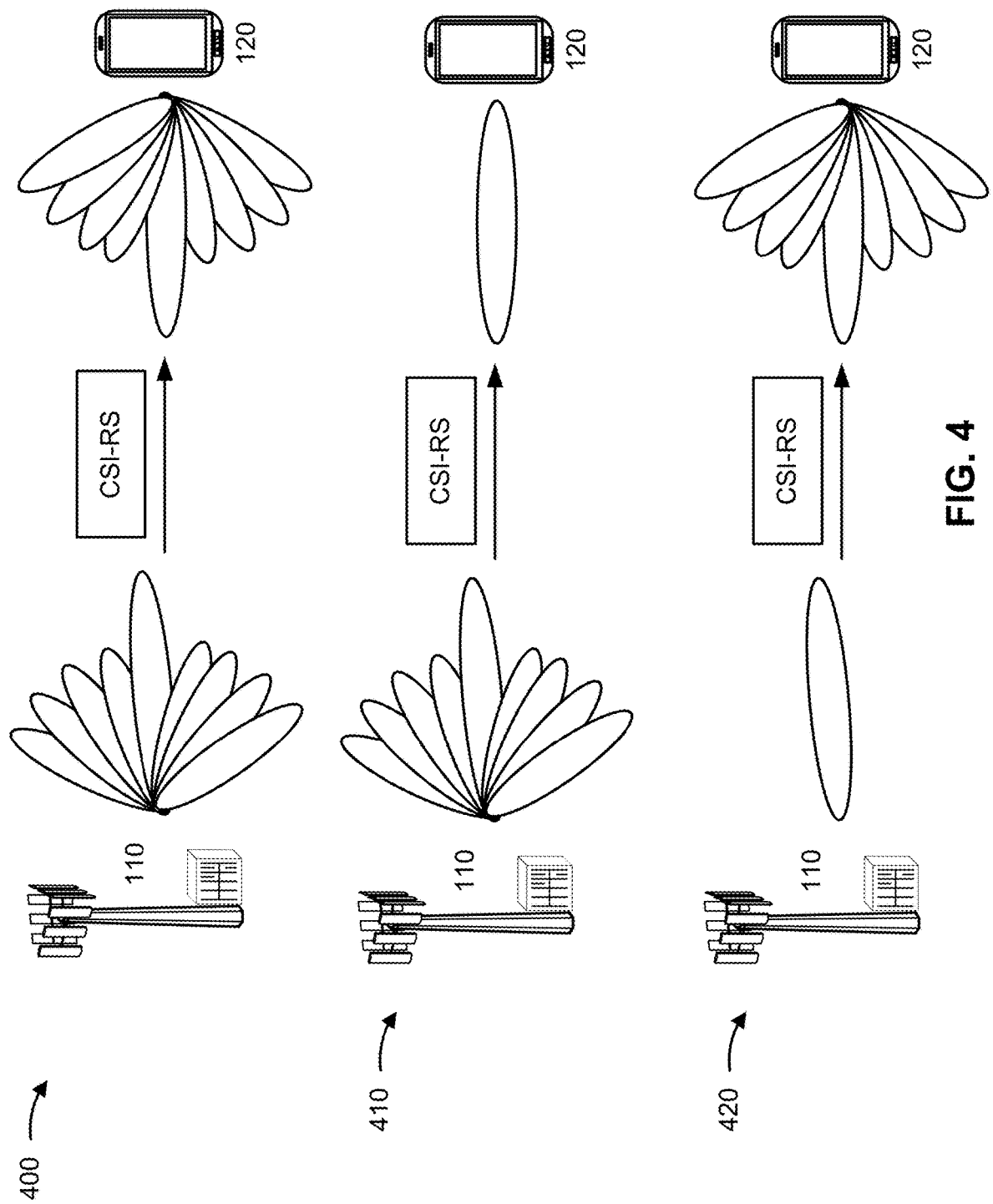
FIG. 4 is a diagram illustrating examples of channel state information (CSI) reference signal (CSI-RS) beam management procedures, in accordance with the present disclosure.

FIG. 4 is a diagram illustrating examples 400, 410, and 420 of channel state information (CSI) reference signal (CSI-RS) beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 (e.g., one or more network node devices such as an RU, a DU, and/or a CU, among other examples) and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same CSI-RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same CSI-RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
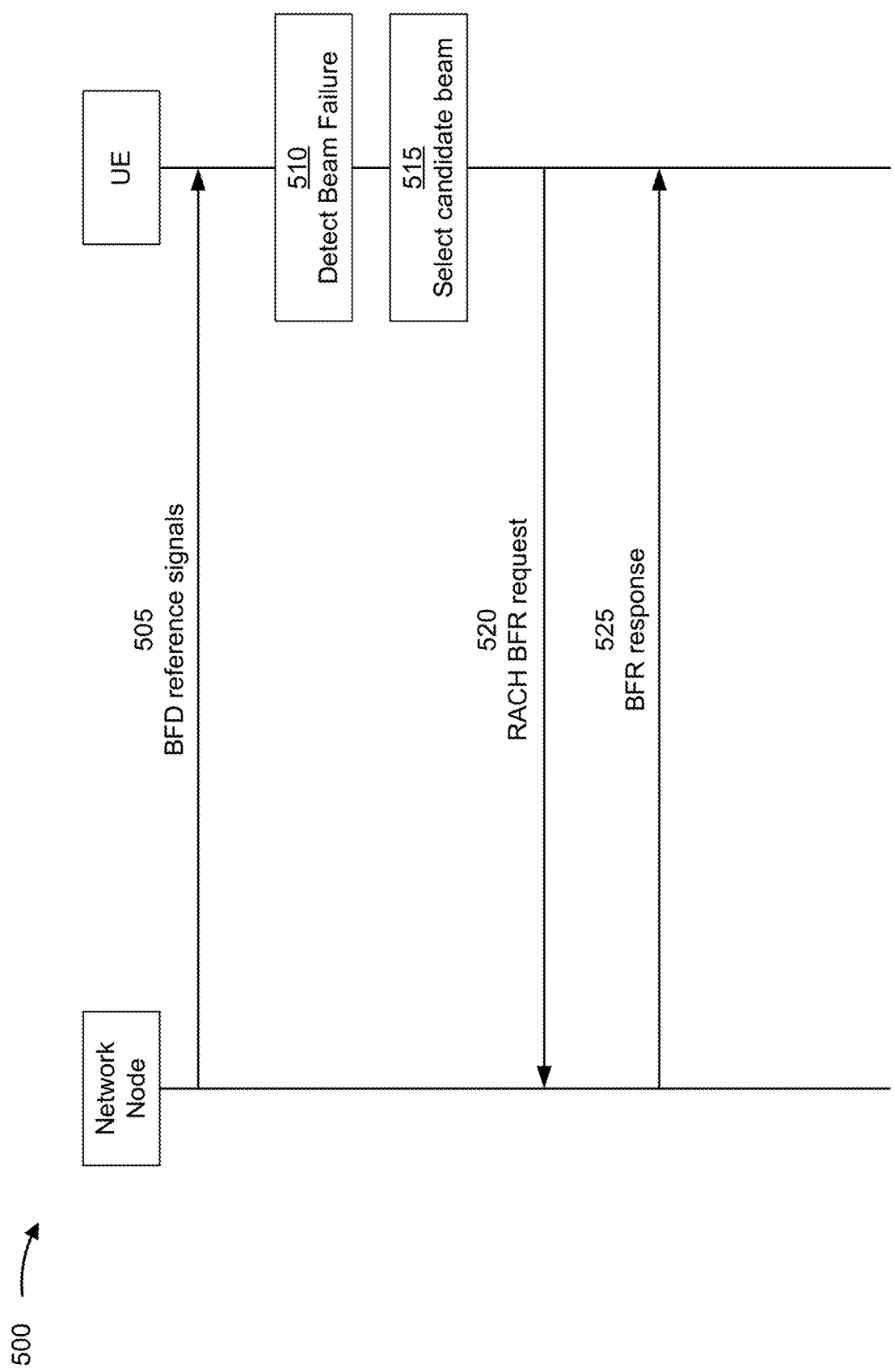
FIG. 5 is a diagram illustrating an example of beam failure detection (BFD) and beam failure recovery (BFR), in accordance with the present disclosure.

FIG. 5 is a diagram illustrating an example 500 of beam failure detection (BFD) and beam failure recovery (BFR), in accordance with the present disclosure. Example 500 includes a UE (e.g., UE 120) in communication with a network node (e.g., network node 110) in a wireless network (e.g., wireless network 100).

As shown in FIG. 5, and by reference number 505, the UE may receive BFD reference signals transmitted by the network node. The UE may perform BFD based at least in part on measurements performed on the BFD reference signals. The BFD reference signals may include CSI-RSs transmitted using periodic CSI-RS resources configured via a parameter in an RRC message. In some examples, a BFD reference signal set may be configured with up to two reference signals associated with a single antenna port. In a case in which the BFD reference signal set is not configured by the network node, reference signal sets indicated by TCI states of control resource sets (CORESETs) monitored by the UE may be used for BFD. In some examples, in a case in which, for an active CORESET, there are two reference signal indices, the reference signal having a quasi co-location (QCL) parameter of type D may be used for BFD.

As shown by reference number 510, the UE may detect a beam failure based at least in part on the BFD reference signals. The physical layer in the UE may assess radio link quality by measuring RSRP of the BFD reference signals and comparing the RSRP measurements with a threshold (Qout). If the RSRP measurements are less than Qout, the physical layer may provide a beam failure indication (e.g., out of service indication) to a higher layer of the UE (e.g., the MAC layer), which may increment a beam failure indicator counter. The UE may detect beam failure based at least in part on a threshold number of beam failure indications within a certain time duration (e.g., a BFD timer).

As shown by reference number 515, based at least in part on detecting a beam failure, the UE may perform candidate beam detection to select a candidate beam for BFR. The UE may perform candidate beam detection based at least in part on periodic CSI-RSs and/or SSBs configured for a number of beam candidates. In some examples, CSI-RS/SSB resources may be configured for up to 16 beam candidates with corresponding random access preamble indices. Upon a request from a higher layer (e.g., the MAC layer), the physical layer of the UE may detect a reference signal with an RSRP that satisfies a threshold (Qin) and provide the reference signal index to the higher layers.

As shown by reference number 520, the UE may then transmit a random access channel (RACH) BFR request to the network node. For example, the UE may initiate a contention free RACH procedure based on the random access resource (e.g., the random access preamble index) associated with the selected reference signal index corresponding to the selected candidate beam.

As shown by reference number 525, the UE may receive a BFR response based at least in part on transmitting the RACH BFR request. The UE may monitor a physical downlink control channel (PDCCH) search space set to detect a PDCCH communication with a DCI format with a cyclic redundancy check (CRC) scrambled by a cell radio network temporary identifier (C-RNTI) or an MCS cell radio network temporary identifier (MCS-C-RNTI), starting a certain number of slots after transmitting the RACH request (e.g., starting from slot n+4). In this case, the UE monitors for a random access response (e.g., the PDCCH communication), which is the BFR response. The search space for the PDCCH monitoring may be identified by a recovery search space identifier (ID), and, in some examples, the CORESET associated with an SSS provided by the recovery search space ID may not be used for any other SSS. For PDCCH monitoring in the SSS provided by the recovery search space ID and for corresponding physical downlink shared channel (PDSCH) reception, the UE may us the same QCL parameters as those associated with the reference signal index selected during candidate beam selection (e.g., the QCL parameters associated with the selected candidate beam) until the UE receives an activation for a TCI state associated with another beam.

In a case in which the UE receives the PDCCH communication with CRC scrambled by C-RNTI or MCS-C-RNTI within a time window associated with the contention free RACH procedure, the BFR may be complete for the UE. In this case, after a certain number of symbols (e.g., 28 symbols) from a last symbol of the first PDCCH reception, in the search space being monitored by the UE, for which the UE detects a DCI format scrambled by C-RNTI or MCS-C-RNTI, the UE may use the same QCL parameters as those associated with the selected reference signal index for PDCCH monitoring in a CORESET with index 0.

In a case in which the UE does not receive the PDCCH communication with CRC scrambled by C-RNTI or MCS-C-RNTI with the time window associated with the contention free RACH procedure, the UE may initiate a contention-based RACH procedure to transmit the BFR request to the network node. The UE may then monitor the search space for a PDCCH communication with CRC scrambled by C-RNTI or MCS-C-RNTI in response to the contention-based RACH request. In a case, in which the UE does not receive the BFR response in a time window associated with the contention-based RACH procedure, or in a case in which a BFR timer, which starts upon detection of beam failure, expires prior to receiving a BFR response, the UE may declare a radio link failure.

As indicated above, FIG. 5 is provided as an example. Other examples may differ from what is described with respect to FIG. 5.

Figure 6:
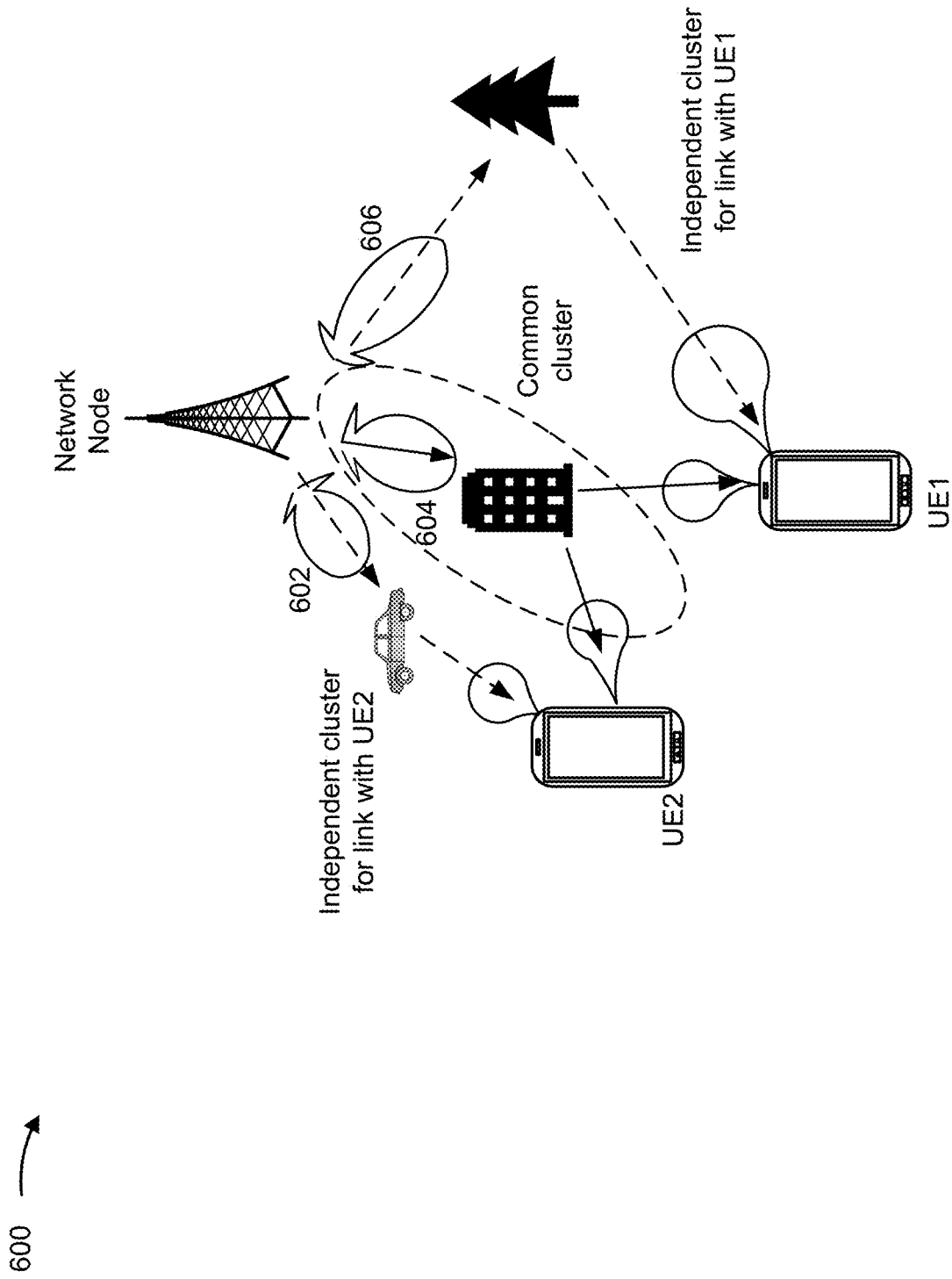
FIG. 6 is a diagram illustrating an example of signal propagation over clusters in a wireless network, in accordance with the present disclosure.

FIG. 6 is a diagram illustrating an example 600 of signal propagation over clusters in a wireless network, in accordance with the present disclosure. Example 600 includes communication between a network node (e.g., network node 110), a first UE (UE1) (e.g., UE 120), and a second UE (UE2) (e.g., UE 120).

In millimeter wave systems, wireless devices (e.g., network nodes and/or UEs) may communicate using directional links established via beams. In some examples, millimeter wave channel structure corresponds to propagation over a set of clusters, where each cluster represents an object that reflects or diffracts signals, or a line of sight path in the environment of the wireless network. For example, a cluster may represent an object that reflects or diffracts signals, transmitted by a network node, with a certain angles of spread, such that the signals reflected or diffracted by the object may be received by multiple UEs within a certain area. In some cases, the number of dominant clusters, via which signals transmitted from a network node to a UE, may be small.

In many small cell settings (e.g., a dense urban or "downtown" setting, a stadium, a shopping mall, a high speed train, a bus, or any other cell in which there are multiple users in a relatively small area) at millimeter wave frequencies, UEs may share a common set of clusters. As shown in FIG. 6, UE1 and UE2 may share a common cluster corresponding to a reflection of the signals transmitted by the network node off a building. In this case, communication on a link between the network node and UE1 and/or communication on a link between the network node and UE2 can be established over the common cluster. As further shown in FIG. 6, there may also be an independent cluster over which communication can be established on the link between the network node and UE1, and an independent cluster over which communication can be established on the link between the network node and UE2. As shown by reference numbers 602, 604, and 606, each cluster may be associated with a different transmit beam (or different sets of transmit beams) of the network node.

As indicated above, FIG. 6 is provided as an example. Other examples may differ from what is described with respect to FIG. 6.

Wireless devices (e.g., network nodes and/or UEs) in millimeter wave systems typically communicate using directional links established via beams. As such wireless devices evolve, the number of antenna elements used by such wireless devices may increase. However, with more antenna elements, beam management procedures, such as beam refinement and/or BFR, make take longer, due to an increase in the number of potential/candidate beams (e.g., along with a decrease in beamwidth of progressive phase shift beams). For example, the usage of non-directional/adaptive beam weights may lead to an increase in the number of reference signals needed for estimating such beam weights for beamforming. In some cases, the number of reference signals needed may vary linearly or quadratically as a function of the number of antenna elements. This may lead to a large number of reference signals for even relatively small antenna arrays (e.g., N=4 or 5, as in the antenna arrays of some UEs). Furthermore, as the number of reference signals used increases, power consumption and thermal issues (e.g., heat generation) may increase for the wireless devices. Accordingly, as the number of antenna elements increases in network nodes and/or UEs, beamforming and beam management procedures may have increased latency and may cause increased power consumption and heat generation by the UEs and/or the network nodes.

Some techniques and apparatuses described herein enable a network node to a network node to perform or assist in beam management for one or more UEs based at least in part on a beam correlation or "similarity" across a set of UEs. In some aspects, the network node may receive, from a plurality of UEs, beam reports that indicate dominant TCI states for the plurality of UEs. The network node may transmit, to a set of UEs selected from the plurality of UEs based at least in part on the beam reports, indications to report a beam correlation metric. The network node may receive, from the set of UEs, respective indications of the beam correlation metric. In some aspects, the network node may perform beam management for one or more UEs based at least in part on the indications of the beam correlation metric received from the set of UEs. For example, channel learning/beam management for a first link between the network node and a first UE may be used, by the network node, to infer channel learning/beam management for a second link between the network node and a second UE based at least in part on a similarity between the first UE and the second UE determined using the indications of the beam correlation metric. As a result, beamforming and/or beam management procedures, such as beam refinement and/or BFR, may be sped up, resulting in decreased latency of such beamforming and/or beam management procedures and decreased power consumption and heat generation for UEs.

Figure 7:
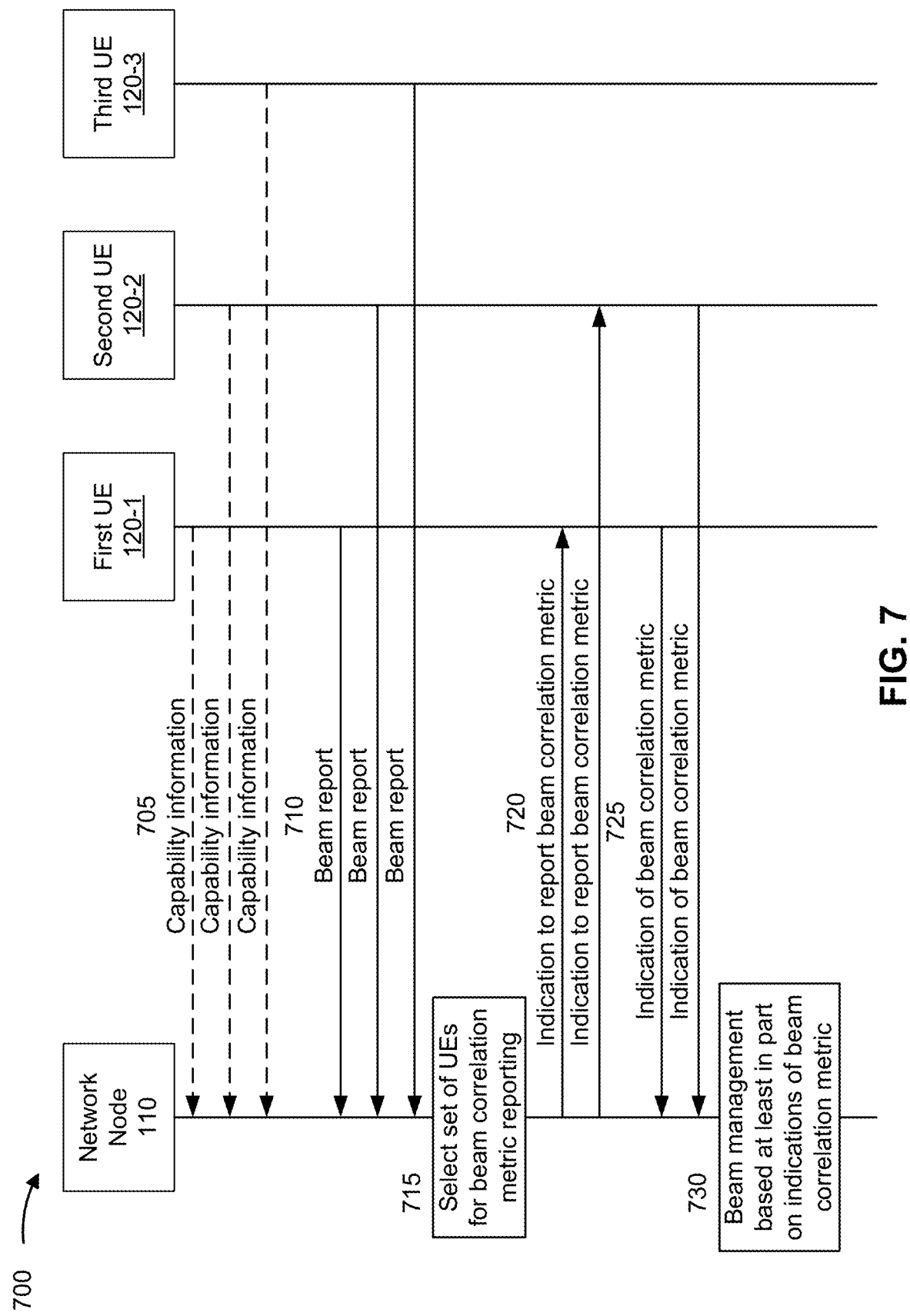
FIG. 7 is a diagram illustrating an example associated with beam correlation metric reporting, in accordance with the present disclosure.

FIG. 7 is a diagram illustrating an example 700 associated with beam correlation metric reporting, in accordance with the present disclosure. As shown in FIG. 7, example 700 includes communication between a network node 110 and multiple UEs 120, including a first UE 120-1, a second UE 120-2, and a third UE 120-3. In some aspects, the network node 110 and the UEs 120 may be included in a wireless network, such as wireless network 100. The network node 110 and the UEs 120 may communicate via wireless access links, which may include uplinks and downlinks.

As shown in FIG. 7, and by reference number 705, in some aspects, each UE 120 (e.g., the first UE 120-1, the second UE 120-2, and the third UE 120-3) may transmit, to the network node 110, respective capability information associated with that UE 120. The network node 110 may receive the respective capability information transmitted by the UEs. For example, the capability information may be included in a respective UE capability report transmitted by each UE 120. In some aspects, the capability information may include an indication of a UE capability to infer or learn channel and/or beam information. In some aspects, the capability information may include an indication of a UE capability to perform machine learning based inferencing of channel and/or beam information. In some aspects, the capability information may include an indication of a UE capability to report a beam correlation metric to the network node 110.

As further shown in FIG. 7, and by reference number 710, a plurality of UEs 120 (e.g., the first UE 120-1, the second UE 120-2, and the third UE 120-3) may transmit beam reports to the network node 110. The network node 110 may receive the beam reports transmitted by the plurality of UEs 120. For example, the network node 110 may receive respective beam reports from each UE 120 (e.g., the first UE 120-1, the second UE 120-2, and the third UE 120-3) of a plurality of UEs 120 serviced by the network node 110. Each beam report may indicate one or more dominant TCI states for the UE 120 that transmitted the beam report. For example, each UE 120 may be configured to indicate, in the beam report, a number (e.g., 4) of most dominant TCI states for the UE 120. The dominant TCI states, indicated in the beam report, may correspond to beam directions of transmit beams of the network node 110 (e.g., beams used for transmitting downlink communications by the network node 110). In some aspects, a UE 120 may determine the one or more most dominant TCI states for the UE 120 based at least in part on measurements of downlink reference signals (e.g., CSI-RSs and/or SSBs) associated with different TCI states (e.g., different beam directions) that are transmitted by the network node 110.

As further shown in FIG. 7, and by reference number 715, the network node 110 may select a set of UEs 120 for beam correlation metric reporting based at least in part on the beam reports received from the plurality of UEs 120. The network node 110 may select the set of UEs 120 for beam correlation metric reporting from the plurality of UEs 120 from which the beam reports are received. For example, in example 700 of FIG. 7, the network node 110 may receive the beam reports from the first UE 120-1, the second UE 120-2, and the third UE 120-3, and the network node 110 may select the first UE 120-1 and the second UE 120-2 for beam correlation metric reporting based at least in part on the beam reports.

The network node 110, to select the set of UEs 120, may select one or more UEs 120 (e.g., the first UE 120-1 and the second UE 120-2) that will report a beam correlation metric to the network node 110. In some aspects, the network node 110 may select the set of UEs 120 for beam correlation metric reporting based at least in part on the dominant TCI states indicated for the UEs 120 in the beam reports. For example, the network node 110 may select multiple UEs 120 associated with a same dominant TCI state (e.g., multiple UEs that indicate, in the one or more dominant TCI states indicated in the respective beam reports, at least one same TCI state) to be included in the set of UEs 120 for beam correlation metric reporting. Additionally, or alternatively, the network node 110 may select the set of UEs for beam correlation metric reporting based at least in part on the UE speeds, UE locations within the serving environment, and/or a density of UEs at locations within the serving environment, among other examples. In some aspects, the set of UEs 120, selected by the network node 110 for beam correlation metric reporting, may include multiple UEs that the network node 110 determines to be candidates share a common cluster based at least in part on the reported TCI states for the UEs 120, the locations of the UEs 120, and/or the speed of the UEs 120, among other examples.

As further shown in FIG. 7, and by reference number 720, the network node 110 may transmit to the selected set of UEs 120 (e.g., the first UE 120-1 and the second UE 120-2) indications to report a beam correlation metric. The selected set of UEs 120 (e.g., the first UE 120-1 and the second UE 120-2) may receive, from the network node 110, the indications to report the beam correlation metric. For example, the network node 110 may transmit a respective indication to report a beam correlation metric to each UE 120 (e.g., the first UE 120-1 and the second UE 120-2) in the selected set of UEs 120, and each UE 120 (e.g., the first UE 120-1 and the second UE 120-2) in the selected set of UEs 120 may receive the respective indication to report a beam correlation metric. The beam correlation metric (or "similarity" metric) may include information to be used by the network node 110 to assess similarity and/or beam correlation between different UEs 120. In some aspects, the beam correlation metric may include a time-scale over which no beam switching has occurred for a UE 120 and one or more locations of the UE 120 over the time-scale. In this case, the indication to report the beam correlation metric may indicate, to a UE 120, to report the time-scale over which no beam switching has occurred for that UE 120 and one or more locations of the UE 120 over the time-scale. Additionally, or alternatively, the beam correlation metric may include other information, such as a time-scale at which the received signal strength for the UE 120 remains at a certain level.

The indication to report the beam correlation metric may indicate a configuration that configures beam correlation metric reporting for the UEs 120 (e.g., the first UE 120-1 and the second UE 120-2). In some aspects, the indication to report the beam correlation metric may specify uplink resources (e.g., time and/or frequency resources) to be used for reporting the beam correlation metric. In some aspects, the indication to report the beam correlation metric may configure an aperiodic beam correlation metric report. In some aspects, the indication to report the beam correlation metric may configure periodic or semi-persistent beam correlation metric reporting. In this case, the indication to report the beam correlation metric may indicate a periodicity at which the UE 120 is to report the beam correlation metric. In some aspects, the network node 110 may determine the configuration of the beam correlation metric reporting for the selected set of UEs 120 based at least in part on UE speeds, UE locations within the serving environment, and/or the density of the UEs 120, among other examples.

As further shown in FIG. 7, and by reference number 725, each UE 120 (e.g., the first UE 120-1 and the second UE 120-2) in the selected set of UEs 120 for beam correlation metric reporting may transmit, to the network node 110, a respective indication of the beam correlation metric. The network node 110 may receive, from each UE 120 (e.g., the first UE 120-1 and the second UE 120-2) in the selected set of UEs 120, the respective indication of the beam correlation metric. In some aspects, the beam correlation metric may include a time-scale over which no beam switching has occurred for a UE 120 and one or more locations of the UE 120 over the time-scale. In this case, the respective indication of the beam correlation metric transmitted by a UE 120 (e.g., the first UE 120-1 or the second UE 120-2) may indicate the time-scale over which no beam switching has occurred for that UE 120 and one or more locations of that UE 120 over the time-scale. In some aspects, each UE 120 (e.g., the first UE 120-1 and the second UE 120-2) may transmit the respective indication of the beam correlation metric in accordance with the configuration information included in the indication to report the beam correlation metric.

As further shown in FIG. 7, and by reference number 730, the network node 110 may perform beam management for one or more UEs 120 based at least in part on the respective indications of the beam correlation metric received from the selected set of UEs 120 (e.g., the first UE 120-1 and the second UE 120-2). In some aspects, the network node 110 may determine a "similarity" or beam correlation between the UEs 120 in the selected set of UEs 120 based at least in part on the beam correlations metric information reported by the UEs 120. For example, the network node 110 may determine a similarity or beam correlation between the first UE 120-1 and the second UE 120-2 based at least in part on the respective indications of the beam correlation metric received from the first UE 120-1 and the second UE 120-2. In some aspects, to determine the beam correlation between the first UE 120-1 and the second UE 120-2, the network node 110 may determine a correlation between a main lobe direction of a beam (e.g., a receive beam) used by the first UE 120-1 and a beam (e.g., a receive beam) used by the second UE 120-2 (e.g., a correlation between the main lobe direction of the receive beams used by the first UE 120-1 and the second UE 120-2 to receive downlink transmissions associated with the same TCI state). In this case, the network node 110 may determine the correlation between the main lobe direction of the beams based at least in part on an azimuth angle of arrival (AoA) and/or a zenith angle of arrival (ZoA) overlap between the beams. In some aspects, the network node 110 may determine a similarity score between the UEs 120 (e.g., the first UE 120-1 and the second UE 120-2) based at least in part on the beam correlation. In some aspects, the network node 110 may determine whether the first UE 120-1 and the second UE 120-2 are "similar" UEs based at least in part on a determination of whether the beam correlation between the first UE 120-1 and the second UE 120-2 (e.g., the correlation between the main lobe direction of the beams used by the first UE 120-1 and the second UE 120-2) satisfies a threshold. For example, the network node 110 may determine that the first UE 120-1 and the second UE 120-2 are similar UEs based at least in part on a determination that the main lobe directions of the beam used by the first UE 120-1 and the second UE 120-2 are within 10 degrees. In some aspects, the determination that UEs 120 are similar may correspond to a determination that the UEs 120 share a common cluster. For example, in a case of a 4-5 element antenna array at the UE side and a beamwidth of 20-25 degrees, a 10 degree separation between beams with a distance of D meters between a UE 120 and a common cluster (for the set of UEs 120) corresponds to a distance of approximately $D*\sin(10\text{ degrees}) \approx D*10*\pi/180$. In this case, at a 20 meter distance from the common cluster, a 10 degree separation between beams used by UEs 120 corresponds to approximately a 3-4 meter separation between users. In some aspects, the network node 110 may apply a machine learning model to determine the beam correlation and/or the similarity between multiple UEs 120 based at least in part on the beam correlation metric information reported by the UEs 120.

In some aspects, based at least in part on the respective indications of the beam correlation metric (e.g., reporting of time-scales with no beam switching and location information) from the set of UEs 120 (e.g., the first UE 120-1 and the second UE 120-2), the network node 110 may determine whether a new UE 120 (e.g., a fourth UE that is not included in the set of UEs 120 for beam correlation metric reporting) that is within a certain distance of one or more UEs 120 in the set of UEs 120 is expected to observe a similar channel to the one or more UEs 120 in the set of UEs 120. For example, the network node 110 may determine (e.g., predict or infer) that the new UE 120 (e.g., the fourth UE) is expected to share a common cluster with the first UE 120-1 and the second UE 120-2 based at least in part on a determination that the fourth UE 120 is within a certain distance of the first UE 120-1 and the second UE 120-2, and based at least in part on a determination that beam correlation between first UE 120-1 and second UE 120-2 satisfies the threshold (e.g., 10 degrees). In this case, the network node 110 may determine that the new UE 120 (e.g., the fourth UE) is similar to the first UE 120-1 and/or the second UE 120-2, and the network node 110 may infer beam information (e.g., a TCI state) for a link associated with the new UE 120 based at least in part on the beam information (e.g., the TCI state) for a link associated with the first UE 120-1 and/or the beam information (e.g., the TCI state) for a link associated with the second UE 120-2.

In some aspects, in a case in which the network node 110 determines that two UEs 120 are similar (e.g., with a beam correlation that satisfies a threshold) based at least in part on the reported beam metric information, channel and/or beam information (e.g., TCI state) for one link may be shared with the other link (or used to infer channel and/or beam information for the other link). In some aspects, in a case in which the network node 110 determines that two UEs 120 are similar based at least in part on the reported beam metric information, the network node 110 may transmit, to a first one of the UEs 120, an indication of a first TCI state for a first link associated with the first one of the UEs 120 based at least in part on a second TCI state for a second link associated with a second one of the UEs 120. In some aspects, in a case in which the network node 110 determines that two UEs 120 are similar based at least in part on the reported beam metric information, the network node 110 may transmit, to the first one of the UEs 120, an indication of a set of reference signal resources (e.g., CSI-RS and/or sounding reference signal (SRS) resources) for beam refinement that is based at least in part on a TCI state for a link associated with the second one of the UEs 120. For example, the set of reference signal resources may include a reduced set of reference signal resources, based at least in part on the TCI state for the link associated with the second one of the UEs 120, as compared with a full set of reference signal resources for beam refinement. In this way, beam refinement for the first one of the UEs 120 can be sped up without over-provisioning CSI-RS or SRS resources.

In some aspects, the similarity or beam correlation between UEs 120 may be used by the network node 110 to predict early blockage of a link associated with one UE 120 based at least in part on blockage of a link associated with another UE 120. For example, the network node 110 may determine that the similarity or beam correlation between the first UE 120-1 and the second UE 120-2 based at least in part on the respective indications of the beam correlation metric received from the first UE 120-1 and the second UE 120-2. The network node 110 may receive, from the first UE 120-1, an indication of a blockage of a first link associated with the first UE 120-1, and the network node 110 may predict a blockage of a second link associated with the second UE 120-2 based at least in part on the similarity between the first UE 120-1 and the second UE 120-2. For example, the indication of the blockage of the first link may be an indication, received from the first UE 120-1, of a BFR request. In some aspects, based at least in part on predicting the blockage of the second link, the network node 110 may transmit, to the second UE 120-2, an indication for triggering BFR or beam switching. In this way, the network node 110 may trigger BFR or beam switching for the second UE 120-2, prior to the second UE 120-2 detecting a beam failure.

In some aspects, the network node 110 apply the similarity determination to determine temporal correlations for a UE 120 (e.g., the first UE 120-1 or the second UE 120-2) at different points in time. For example, the network node 110 may determine a similarity, for a link between the network node 110 and the first UE 120-1, between the first UE 120-1 at a first point in time (e.g., at a first location) and the first UE 120-1 at a second point in time (e.g., at a second location) based at least in part on the indication of the beam correlation metric (e.g., including location information for the first UE 120-1) received from the first UE 120-1. In this case, the network node 110 may transmit, to the first UE 120-1, indications of beam candidates in connection with movement of the first UE 120-1 determined based at least in part on the similarity between the first UE 120-1 at the first point in time (e.g., at the first location) and the second UE 120-2 at the second point in time (e.g., at the second location). In this way, the network node 110 may proactively provide a UE 120 that is mobile with beam candidates based at least in part on location correlations for the UE 120.

In some aspects, in a case in which the first UE 120-1 is mobile, the network node 110 may transmit, to the first UE 120-1, indications of beam candidates in connection with movement of the first UE 120-1, based at least in part on temporal location correlations between the first UE 120-1 and one or more other UEs 120 (e.g., the second UE 120-2 and/or one or more other UEs 120) included in the set of UEs 120 that report the beam correlation metric. In this case, the temporal location correlations between the first UE 120-1 and the other UEs 120 may be based at least in part on the respective indications of the beam correlation metric received from the first UE 120-1 and the one or more other UEs 120, and the beam candidates are based at least in part on TCI states for links associated with the one or more other UEs 120.

As indicated above, FIG. 7 is provided as an example. Other examples may differ from what is described with respect to FIG. 7.

Figure 8:
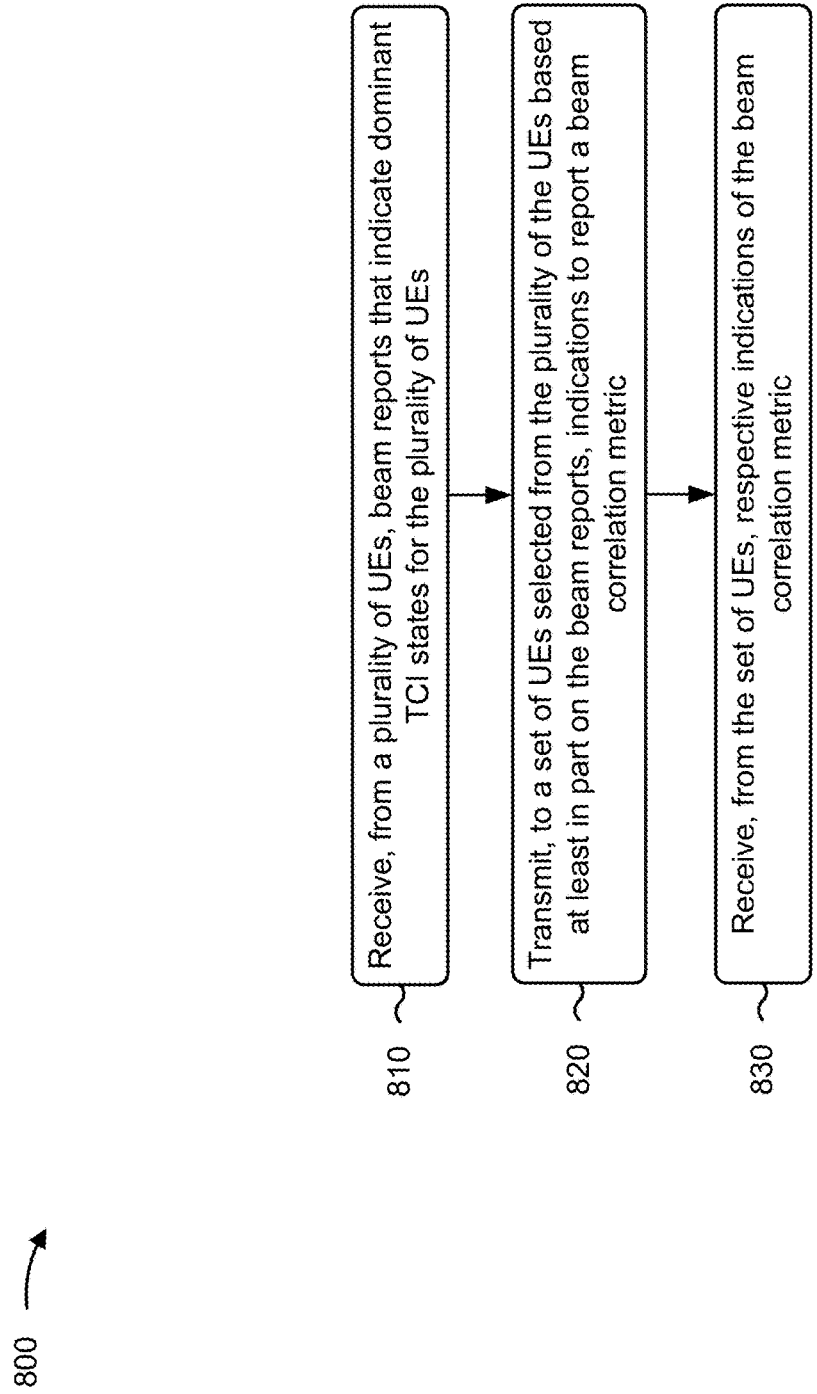
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with beam correlation metric reporting.

As shown in FIG. 8, in some aspects, process 800 may include receiving, from a plurality of UEs, beam reports that indicate dominant TCI states for the plurality of UEs (block 810). For example, the network node (e.g., using communication manager 150 and/or reception component 1002, depicted in FIG. 10) may receive, from a plurality of UEs, beam reports that indicate dominant TCI states for the plurality of UEs, as described above.

As further shown in FIG. 8, in some aspects, process 800 may include transmitting, to a set of UEs selected from the plurality of the UEs based at least in part on the beam reports, indications to report a beam correlation metric (block 820). For example, the network node (e.g., using communication manager 150 and/or transmission component 1004, depicted in FIG. 10) may transmit, to a set of UEs selected from the plurality of the UEs based at least in part on the beam reports, indications to report a beam correlation metric, as described above.

As further shown in FIG. 8, in some aspects, process 800 may include receiving, from the set of UEs, respective indications of the beam correlation metric (block 830). For example, the network node (e.g., using communication manager 150 and/or reception component 1002, depicted in FIG. 10) may receive, from the set of UEs, respective indications of the beam correlation metric, as described above.

Process 800 may include additional aspects, such as any single aspect or any combination of aspects described below and/or in connection with one or more other processes described elsewhere herein.

In a first aspect, the beam correlation metric includes a time-scale over which no beam switching has occurred for a UE and one or more locations of the UE over the time-scale.

In a second aspect, alone or in combination with the first aspect, the set of UEs includes multiple UEs associated with a same dominant TCI state.

In a third aspect, alone or in combination with one or more of the first and second aspects, process 800 includes selecting the set of UEs, from the plurality of UEs, based at least in part on the beam reports and based at least in part on at least one of UE speeds of the plurality of UEs, locations of the plurality of UEs within a serving environment, or a density of the plurality UEs at locations within the serving environment.

In a fourth aspect, alone or in combination with one or more of the first through third aspects, process 800 includes determining, for a first UE that is not included in the set of UEs, a second UE, included in the set of UEs, that is similar to the first UE, based at least in part on a respective indication of the beam correlation metric received from the second UE and a location of the first UE.

In a fifth aspect, alone or in combination with one or more of the first through fourth aspects, process 800 includes transmitting, to the first UE, an indication of a first TCI state for a first link associated with the first UE based at least in part on a second TCI state for a second link associated with the second UE.

In a sixth aspect, alone or in combination with one or more of the first through fifth aspects, process 800 includes transmitting, to the first UE, an indication of a set of reference signal resources for beam refinement, wherein the set of reference signal resources is based at least in part on a TCI state for a link associated with the second UE.

In a seventh aspect, alone or in combination with one or more of the first through sixth aspects, process 800 includes determining a similarity between a first UE, included in the set of UEs, and a second UE, included in the set of UEs, based at least in part on the respective indications of the beam correlation metric received from the first UE and the second UE, receiving, from the first UE, an indication of a blockage of a first link associated with the first UE, and predicting a blockage of a second link associated with the second UE based at least in part on the similarity between the first UE and the second UE.

In an eighth aspect, alone or in combination with one or more of the first through seventh aspects, process 800 includes transmitting, to the second UE, an indication for triggering beam failure recovery or beam switching based at least in part on predicting the blockage of the second link associated with the second UE.

In a ninth aspect, alone or in combination with one or more of the first through eighth aspects, process 800 includes transmitting, to a first UE included in the set of UEs, indications of beam candidates in connection with movement of the first UE, based at least in part on temporal location correlations between the first UE and one or more second UEs included in the set of UEs, wherein the temporal location correlations between the first UE and the one or more second UEs are based at least in part on the respective indications of the beam correlation metric received from the first UE and the one or more second UEs, and wherein the beam candidates are based at least in part on TCI states for links associated with the one or more second UEs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
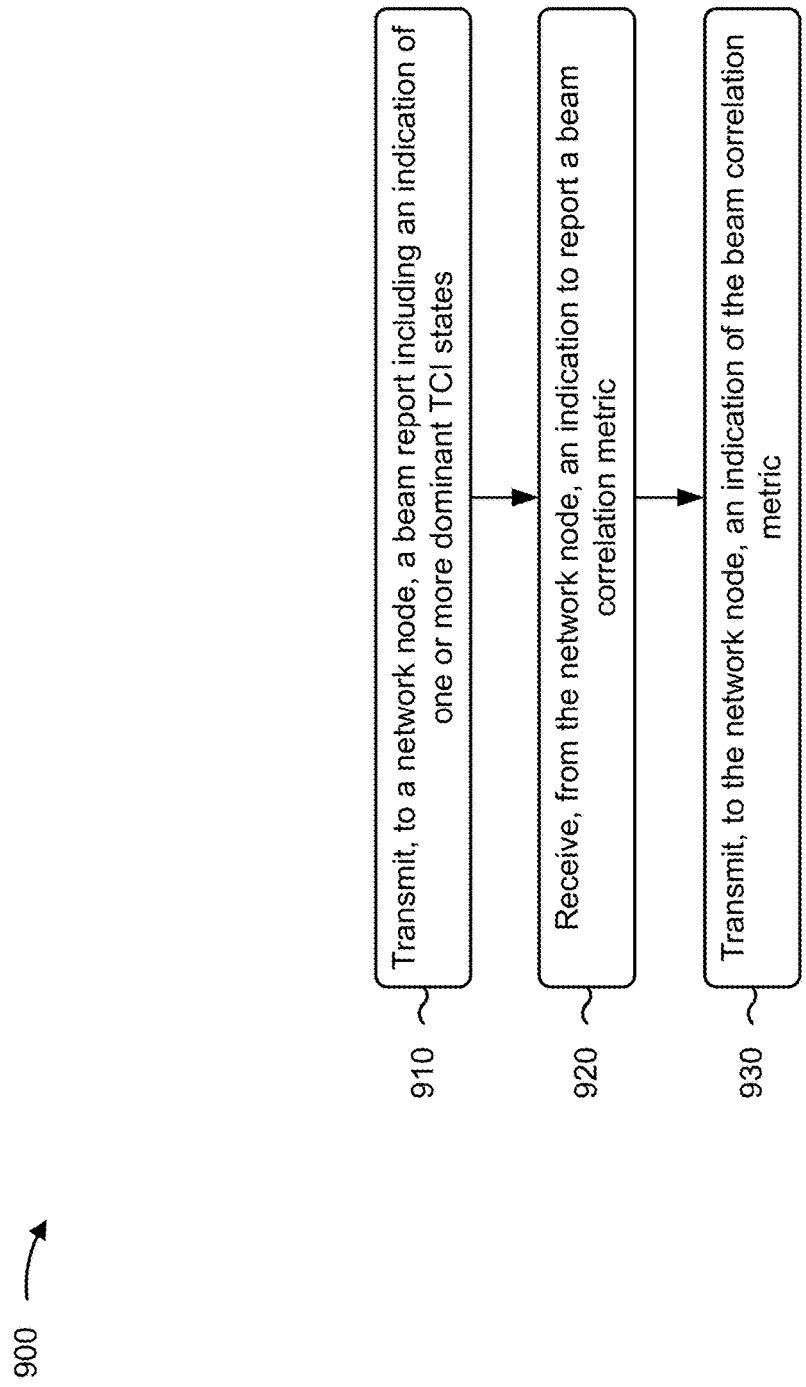
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with beam correlation metric reporting.

As shown in FIG. 9, in some aspects, process 900 may include transmitting, to a network node, a beam report including an indication of one or more dominant TCI states (block 910). For example, the UE (e.g., using communication manager 140 and/or transmission component 1104, depicted in FIG. 11) may transmit, to a network node, a beam report including an indication of one or more dominant TCI states, as described above.

As further shown in FIG. 9, in some aspects, process 900 may include receiving, from the network node, an indication to report a beam correlation metric (block 920). For example, the UE (e.g., using communication manager 140 and/or reception component 1102, depicted in FIG. 11) may receive, from the network node, an indication to report a beam correlation metric, as described above.

As further shown in FIG. 9, in some aspects, process 900 may include transmitting, to the network node, an indication of the beam correlation metric (block 930). For example, the UE (e.g., using communication manager 140 and/or transmission component 1104, depicted in FIG. 11) may transmit, to the network node, an indication of the beam correlation metric, as described above.

Process 900 may include additional aspects, such as any single aspect or any combination of aspects described below and/or in connection with one or more other processes described elsewhere herein.

In a first aspect, the beam correlation metric includes a time-scale over which no beam switching has occurred for the UE and one or more locations of the UE over the time-scale.

In a second aspect, alone or in combination with the first aspect, process 900 includes receiving, from the network node, an indication of a TCI state for a link associated with the UE based at least in part on the indication of the beam correlation metric.

In a third aspect, alone or in combination with one or more of the first and second aspects, process 900 includes receiving, from the network node, an indication of a set of reference signal resources for beam refinement based at least in part on the indication of the beam correlation metric.

In a fourth aspect, alone or in combination with one or more of the first through third aspects, process 900 includes receiving, from the network node, an indication for triggering beam failure recovery or beam switching based at least in part on the indication of the beam correlation metric.

In a fifth aspect, alone or in combination with one or more of the first through fourth aspects, process 900 includes receiving, from the network node, indications of beam candidates in connection with movement of the UE, based at least in part on the indication of the beam correlation metric.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
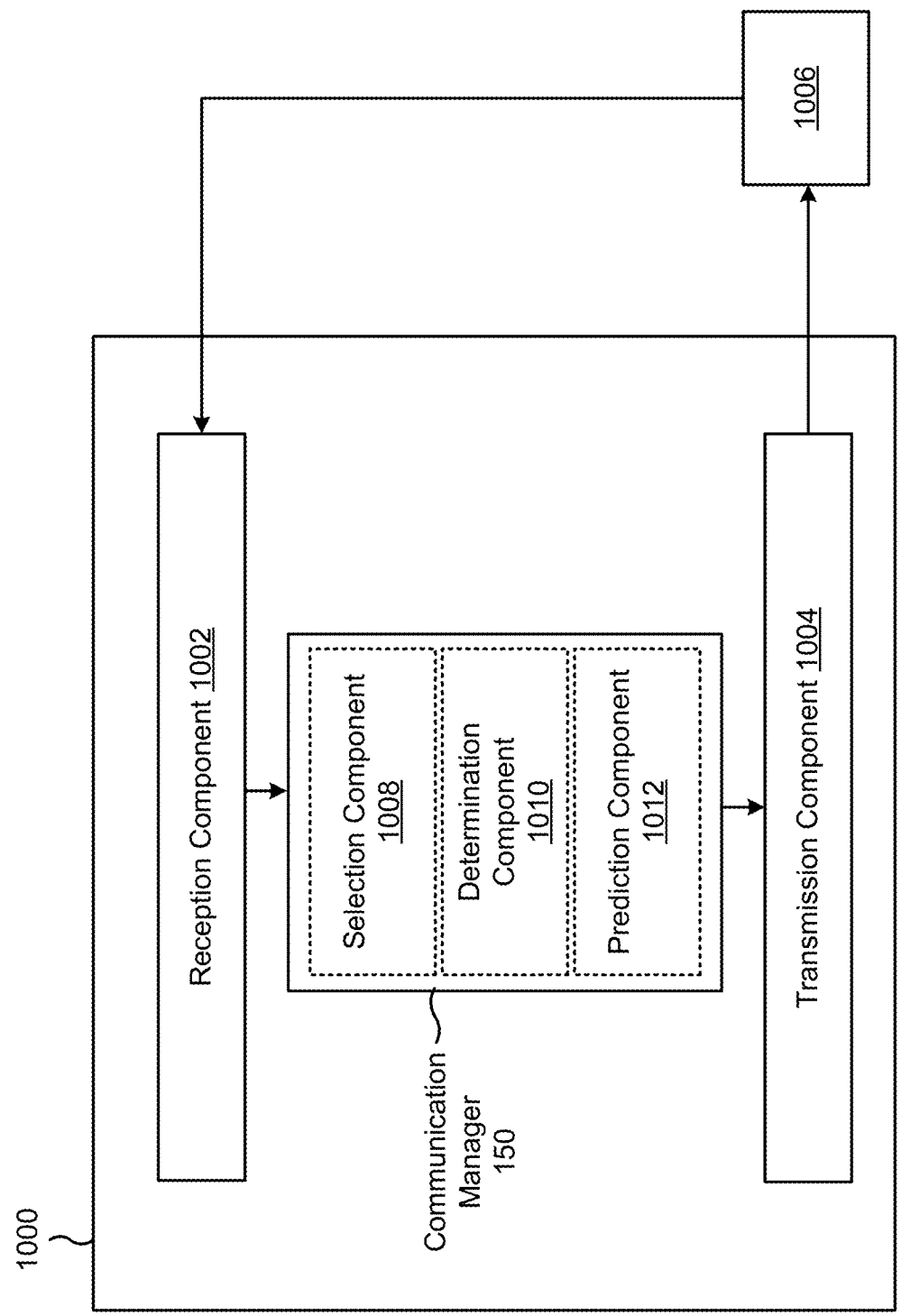
FIGS. 10 and 11 are diagrams of an example apparatuses for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a selection component 1008, a determination component 1010, or a prediction component 1012, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive, from a plurality of user UEs, beam reports that indicate dominant TCI states for the plurality of UEs. The transmission component 1004 may transmit, to a set of UEs selected from the plurality of the UEs based at least in part on the beam reports, indications to report a beam correlation metric. The reception component 1002 may receive, from the set of UEs, respective indications of the beam correlation metric.

The selection component 1008 may select the set of UEs, from the plurality of UEs, based at least in part on the beam reports and based at least in part on at least one of UE speeds of the plurality of UEs, locations of the plurality of UEs within a serving environment, or a density of the plurality UEs at locations within the serving environment.

The determination component 1010 may determine, for a first UE that is not included in the set of UEs, a second UE, included in the set of UEs, that is similar to the first UE, based at least in part on a respective indication of the beam correlation metric received from the second UE and a location of the first UE.

The transmission component 1004 may transmit, to the first UE, an indication of a first TCI state for a first link associated with the first UE based at least in part on a second TCI state for a second link associated with the second UE.

The transmission component 1004 may transmit, to the first UE, an indication of a set of reference signal resources for beam refinement, wherein the set of reference signal resources is based at least in part on a TCI state for a link associated with the second UE.

The determination component 1010 may determine a similarity between a first UE, included in the set of UEs, and a second UE, included in the set of UEs, based at least in part on the respective indications of the beam correlation metric received from the first UE and the second UE.

The reception component 1002 may receive, from the first UE, an indication of a blockage of a first link associated with the first UE.

The prediction component 1012 may predict a blockage of a second link associated with the second UE based at least in part on the similarity between the first UE and the second UE.

The transmission component 1004 may transmit, to the second UE, an indication for triggering beam failure recovery or beam switching based at least in part on predicting the blockage of the second link associated with the second UE.

The transmission component 1004 may transmit, to a first UE included in the set of UEs, indications of beam candidates in connection with movement of the first UE, based at least in part on temporal location correlations between the first UE and one or more second UEs included in the set of UEs, wherein the temporal location correlations between the first UE and the one or more second UEs are based at least in part on the respective indications of the beam correlation metric received from the first UE and the one or more second UEs, and wherein the beam candidates are based at least in part on TCI states for links associated with the one or more second UEs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
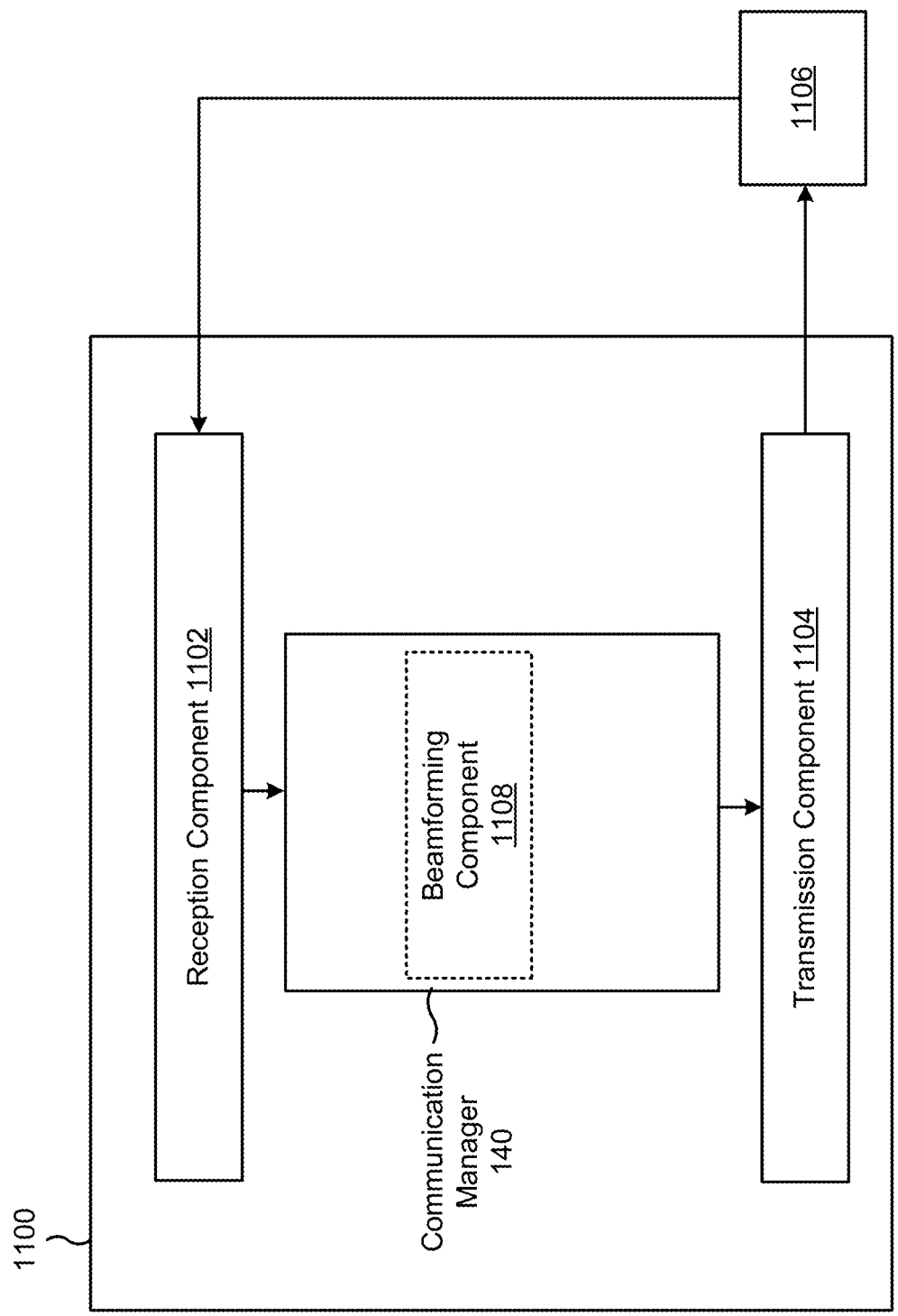

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a beamforming component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, to a network node, a beam report including an indication of one or more dominant TCI states. The reception component 1102 may receive, from the network node, an indication to report a beam correlation metric. The transmission component 1104 may transmit, to the network node, an indication of the beam correlation metric.

The reception component 1102 may receive, from the network node, an indication of a TCI state for a link associated with the UE based at least in part on the indication of the beam correlation metric.

The beamforming component 1108 may perform beamforming based at least in part on the indication of the TCI state for the link associated with the UE.

The reception component 1102 may receive, from the network node, an indication of a set of reference signal resources for beam refinement based at least in part on the indication of the beam correlation metric.

The reception component 1102 may receive, from the network node, an indication for triggering beam failure recovery or beam switching based at least in part on the indication of the beam correlation metric.

The reception component 1102 may receive, from the network node, indications of beam candidates in connection with movement of the UE, based at least in part on the indication of the beam correlation metric.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving, from a plurality of user equipments (UEs), beam reports that indicate dominant transmission configuration indicator (TCI) states for the plurality of UEs; transmitting, to a set of UEs selected from the plurality of the UEs based at least in part on the beam reports, indications to report a beam correlation metric; and receiving, from the set of UEs, respective indications of the beam correlation metric.

Aspect 2: The method of Aspect 1, wherein the beam correlation metric includes a time-scale over which no beam switching has occurred for a UE and one or more locations of the UE over the time-scale.

Aspect 3: The method of any of Aspects 1-2, wherein the set of UEs includes multiple UEs associated with a same dominant TCI state.

Aspect 4: The method of any of Aspects 1-3, further comprising: selecting the set of UEs, from the plurality of UEs, based at least in part on the beam reports and based at least in part on at least one of UE speeds of the plurality of UEs, locations of the plurality of UEs within a serving environment, or a density of the plurality UEs at locations within the serving environment.

Aspect 5: The method of any of Aspects 1-4, further comprising: determining, for a first UE that is not included in the set of UEs, a second UE, included in the set of UEs, that is similar to the first UE, based at least in part on a respective indication of the beam correlation metric received from the second UE and a location of the first UE.

Aspect 6: The method of Aspect 5, further comprising: transmitting, to the first UE, an indication of a first TCI state for a first link associated with the first UE based at least in part on a second TCI state for a second link associated with the second UE.

Aspect 7: The method of any of Aspects 5-6, further comprising: transmitting, to the first UE, an indication of a set of reference signal resources for beam refinement, wherein the set of reference signal resources is based at least in part on a TCI state for a link associated with the second UE.

Aspect 8: The method of any of Aspects 1-7, further comprising: determining a similarity between a first UE, included in the set of UEs, and a second UE, included in the set of UEs, based at least in part on the respective indications of the beam correlation metric received from the first UE and the second UE; receiving, from the first UE, an indication of a blockage of a first link associated with the first UE; and predicting a blockage of a second link associated with the second UE based at least in part on the similarity between the first UE and the second UE.

Aspect 9: The method of Aspect 8, further comprising: transmitting, to the second UE, an indication for triggering beam failure recovery or beam switching based at least in part on predicting the blockage of the second link associated with the second UE.

Aspect 10: The method of any of Aspects 1-9, further comprising: transmitting, to a first UE included in the set of UEs, indications of beam candidates in connection with movement of the first UE, based at least in part on temporal location correlations between the first UE and one or more second UEs included in the set of UEs, wherein the temporal location correlations between the first UE and the one or more second UEs are based at least in part on the respective indications of the beam correlation metric received from the first UE and the one or more second UEs, and wherein the beam candidates are based at least in part on TCI states for links associated with the one or more second UEs.

Aspect 11: A method of wireless communication performed by a user equipment (UE), comprising: transmitting, to a network node, a beam report including an indication of one or more dominant transmission configuration indicator (TCI) states; receiving, from the network node, an indication to report a beam correlation metric; and transmitting, to the network node, an indication of the beam correlation metric.

Aspect 12: The method of Aspect 11, wherein the beam correlation metric includes a time-scale over which no beam switching has occurred for the UE and one or more locations of the UE over the time-scale.

Aspect 13: The method of any of Aspects 11-12, further comprising: receiving, from the network node, an indication of a TCI state for a link associated with the UE based at least in part on the indication of the beam correlation metric.

Aspect 14: The method of any of Aspects 11-13, further comprising: receiving, from the network node, an indication of a set of reference signal resources for beam refinement based at least in part on the indication of the beam correlation metric.

Aspect 15: The method of any of Aspects 11-14, further comprising: receiving, from the network node, an indication for triggering beam failure recovery or beam switching based at least in part on the indication of the beam correlation metric.

Aspect 16: The method of any of Aspects 11-15, further comprising: receiving, from the network node, indications of beam candidates in connection with movement of the UE, based at least in part on the indication of the beam correlation metric.

Aspect 17: An apparatus for wireless communication at a device, comprising a processor; memory coupled with the processor; and instructions stored in the memory and executable by the processor to cause the apparatus to perform the method of one or more of Aspects 1-10.

Aspect 18: A device for wireless communication, comprising a memory and one or more processors coupled to the memory, the one or more processors configured to perform the method of one or more of Aspects 1-10.

Aspect 19: An apparatus for wireless communication, comprising at least one means for performing the method of one or more of Aspects 1-10.

Aspect 20: A non-transitory computer-readable medium storing code for wireless communication, the code comprising instructions executable by a processor to perform the method of one or more of Aspects 1-10.

Aspect 21: A non-transitory computer-readable medium storing a set of instructions for wireless communication, the set of instructions comprising one or more instructions that, when executed by one or more processors of a device, cause the device to perform the method of one or more of Aspects 1-10.

Aspect 22: An apparatus for wireless communication at a device, comprising a processor; memory coupled with the processor; and instructions stored in the memory and executable by the processor to cause the apparatus to perform the method of one or more of Aspects 11-16.

Aspect 23: A device for wireless communication, comprising a memory and one or more processors coupled to the memory, the one or more processors configured to perform the method of one or more of Aspects 11-16.

Aspect 24: An apparatus for wireless communication, comprising at least one means for performing the method of one or more of Aspects 11-16.

Aspect 25: A non-transitory computer-readable medium storing code for wireless communication, the code comprising instructions executable by a processor to perform the method of one or more of Aspects 11-16.

Aspect 26: A non-transitory computer-readable medium storing a set of instructions for wireless communication, the set of instructions comprising one or more instructions that, when executed by one or more processors of a device, cause the device to perform the method of one or more of Aspects 11-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
   one or more memories; and
   one or more processors, coupled to the one or more memories, configured to:
   receive, from a plurality of user equipments (UEs), beam reports that indicate dominant transmission configuration indicator (TCI) states for the plurality of UEs;
   transmit, to a set of UEs selected from the plurality of UEs based at least in part on the beam reports, indications to report a beam correlation metric; and
   receive, from the set of UEs, respective indications of the beam correlation metric, wherein the beam correlation metric includes a time-scale over which no beam switching has occurred for a UE of the set of UEs.

2. The network node of claim 1, wherein the beam correlation metric further includes one or more locations of the UE over the time-scale.

3. The network node of claim 1, wherein the set of UEs includes multiple UEs associated with a same dominant TCI state.

4. The network node of claim 1, wherein the one or more processors are further configured to:
select the set of UEs, from the plurality of UEs, based at least in part on the beam reports and based at least in part on at least one of UE speeds of the plurality of UEs, locations of the plurality of UEs within a serving environment, or a density of the plurality UEs at locations within the serving environment.

5. The network node of claim 1, wherein the one or more processors are further configured to:
determine, for a first UE that is not included in the set of UEs, a second UE, included in the set of UEs, that is similar to the first UE, based at least in part on a respective indication of the beam correlation metric received from the second UE and a location of the first UE.

6. The network node of claim 5, wherein the one or more processors are further configured to:
transmit, to the first UE, an indication of a first TCI state for a first link associated with the first UE based at least in part on a second TCI state for a second link associated with the second UE.

7. The network node of claim 5, wherein the one or more processors are further configured to:
transmit, to the first UE, an indication of a set of reference signal resources for beam refinement, wherein the set of reference signal resources is based at least in part on a TCI state for a link associated with the second UE.

8. The network node of claim 1, wherein the one or more processors are further configured to:
determine a similarity between a first UE, included in the set of UEs, and a second UE, included in the set of UEs, based at least in part on the respective indications of the beam correlation metric received from the first UE and the second UE;
receive, from the first UE, an indication of a blockage of a first link associated with the first UE; and
predict a blockage of a second link associated with the second UE based at least in part on the similarity between the first UE and the second UE.

9. The network node of claim 8, wherein the one or more processors are further configured to:
transmit, to the second UE, an indication for triggering beam failure recovery or beam switching based at least in part on predicting the blockage of the second link associated with the second UE.

10. The network node of claim 1, wherein the one or more processors are further configured to:
transmit, to a first UE included in the set of UEs, indications of beam candidates in connection with movement of the first UE, based at least in part on temporal location correlations between the first UE and one or more second UEs included in the set of UEs, wherein the temporal location correlations between the first UE and the one or more second UEs are based at least in part on the respective indications of the beam correlation metric received from the first UE and the one or more second UEs, and wherein the beam candidates are based at least in part on TCI states for links associated with the one or more second UEs.

11. A user equipment (UE) for wireless communication, comprising:
one or more memories; and
one or more processors, coupled to the one or more memories, configured to:
transmit a beam report including an indication of one or more dominant transmission configuration indicator (TCI) states;
receive an indication to report a beam correlation metric; and
transmit an indication of the beam correlation metric, wherein the beam correlation metric includes a time-scale over which no beam switching has occurred for the UE.

12. The UE of claim 11, wherein the beam correlation metric further includes one or more locations of the UE over the time-scale.

13. The UE of claim 11, wherein the one or more processors are further configured to:
receive, from a network node, an indication of a TCI state for a link associated with the UE based at least in part on the indication of the beam correlation metric.

14. The UE of claim 11, wherein the one or more processors are further configured to:
receive, from a network node, an indication of a set of reference signal resources for beam refinement based at least in part on the indication of the beam correlation metric.

15. The UE of claim 11, wherein the one or more processors are further configured to:
receive, from a network node, an indication for triggering beam failure recovery or beam switching based at least in part on the indication of the beam correlation metric.

16. The UE of claim 11, wherein the one or more processors are further configured to:
receive, from a network node, indications of beam candidates in connection with movement of the UE, based at least in part on the indication of the beam correlation metric.

17. A method of wireless communication performed by a network node, comprising:
receiving, from a plurality of user equipments (UEs), beam reports that indicate dominant transmission configuration indicator (TCI) states for the plurality of UEs;
transmitting, to a set of UEs selected from the plurality of UEs based at least in part on the beam reports, indications to report a beam correlation metric; and
receiving, from the set of UEs, respective indications of the beam correlation metric, wherein the beam correlation metric includes a time-scale over which no beam switching has occurred for a UE of the set of UEs.

18. The method of claim 17, wherein the beam correlation metric further includes one or more locations of the UE over the time-scale.

19. The method of claim 17, wherein the set of UEs includes multiple UEs associated with a same dominant TCI state.

20. The method of claim 17, further comprising:
selecting the set of UEs, from the plurality of UEs, based at least in part on the beam reports and based at least in part on at least one of UE speeds of the plurality of UEs, locations of the plurality of UEs within a serving environment, or a density of the plurality UEs at locations within the serving environment.

21. The method of claim 17, further comprising:
determining, for a first UE that is not included in the set of UEs, a second UE, included in the set of UEs, that is similar to the first UE, based at least in part on a respective indication of the beam correlation metric received from the second UE and a location of the first UE.

22. The method of claim 21, further comprising:
transmitting, to the first UE, an indication of a first TCI state for a first link associated with the first UE based at least in part on a second TCI state for a second link associated with the second UE.

23. The method of claim 21, further comprising:
transmitting, to the first UE, an indication of a set of reference signal resources for beam refinement, wherein the set of reference signal resources is based at least in part on a TCI state for a link associated with the second UE.

24. The method of claim 17, further comprising:
determining a similarity between a first UE, included in the set of UEs, and a second UE, included in the set of UEs, based at least in part on the respective indications of the beam correlation metric received from the first UE and the second UE;
receiving, from the first UE, an indication of a blockage of a first link associated with the first UE; and
predicting a blockage of a second link associated with the second UE based at least in part on the similarity between the first UE and the second UE.

25. The method of claim 24, further comprising:
transmitting, to the second UE, an indication for triggering beam failure recovery or beam switching based at least in part on predicting the blockage of the second link associated with the second UE.

26. The method of claim 17, further comprising:
transmitting, to a first UE included in the set of UEs, indications of beam candidates in connection with movement of the first UE, based at least in part on temporal location correlations between the first UE and one or more second UEs included in the set of UEs, wherein the temporal location correlations between the first UE and the one or more second UEs are based at least in part on the respective indications of the beam correlation metric received from the first UE and the one or more second UEs, and wherein the beam candidates are based at least in part on TCI states for links associated with the one or more second UEs.

27. A method of wireless communication performed by a user equipment (UE), comprising:
transmitting a beam report including an indication of one or more dominant transmission configuration indicator (TCI) states;
receiving an indication to report a beam correlation metric; and
transmitting an indication of the beam correlation metric, wherein the beam correlation metric includes a time-scale over which no beam switching has occurred for the UE.

28. The method of claim 27, wherein the beam correlation metric further includes one or more locations of the UE over the time-scale.

29. The method of claim 28, further comprising:
receiving, from a network node, an indication of a set of reference signal resources for beam refinement based at least in part on the indication of the beam correlation metric.

30. The method of claim 28, further comprising:
receiving, from a network node, an indication for triggering beam failure recovery or beam switching based at least in part on the indication of the beam correlation metric.

* * * * *